United States Patent [19]
Parker

[11] Patent Number: 5,340,153
[45] Date of Patent: Aug. 23, 1994

[54] SKI TRANSPORT DOLLY

[76] Inventor: Stephen J. Parker, 2319 Fawnwood La., Spring, Tex. 77386

[21] Appl. No.: 82,443

[22] Filed: Jun. 25, 1993

[51] Int. Cl.$^5$ ............................................. A63C 11/02
[52] U.S. Cl. .................. 280/814; 280/47.17; 280/47.24
[58] Field of Search ............ 280/809, 814, 816, 47.17, 280/47.24, 63, 47.131

[56] References Cited

U.S. PATENT DOCUMENTS

| | | | |
|---|---|---|---|
| 3,779,568 | 12/1973 | Wakabayashi | 280/814 |
| 4,620,722 | 11/1986 | Dunn | 280/814 |
| 4,666,184 | 5/1987 | Garvey, Jr. | 280/874 |
| 4,729,591 | 3/1988 | Scalise | 280/814 |
| 4,792,159 | 12/1988 | Garvey, Jr. et al. | 280/814 |
| 4,968,060 | 11/1990 | Rooney | 280/814 |
| 5,106,112 | 4/1992 | Sargent | 280/814 |

FOREIGN PATENT DOCUMENTS 898864 4/1972 Canada ............................ 280/814

*Primary Examiner*—Richard M. Camby
*Attorney, Agent, or Firm*—Richard L. Miller

[57] ABSTRACT

A ski equipment carrier comprising two major components: a wheel component, which clamps onto the skis and has two wheels for rolling the skis, and a handle component, which clamps onto the skis and has a handle, which has provisions for carrying ski poles and boots. The ski carrier may carry two pairs of skis, holding a pair on each side, or a single pair, with one ski on each side. The carrier will also carry two pairs of ski poles, which clamp onto the side of the handle component, and two pairs of ski boots, which hang beneath the handle component.

10 Claims, 1 Drawing Sheet

U.S. Patent     Aug. 23, 1994     5,340,153
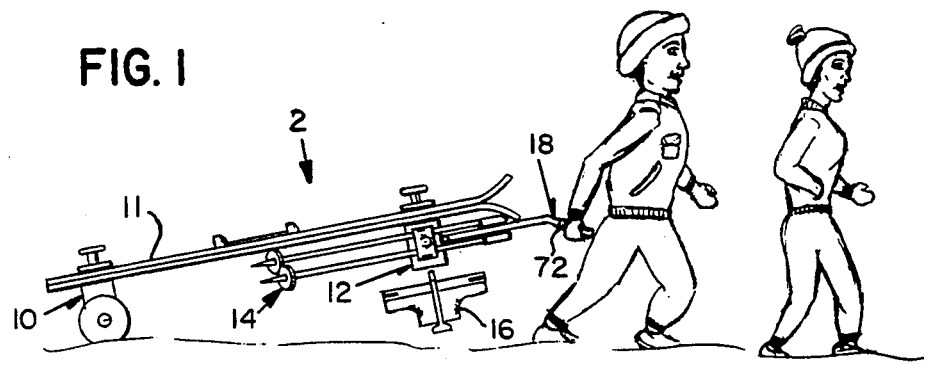
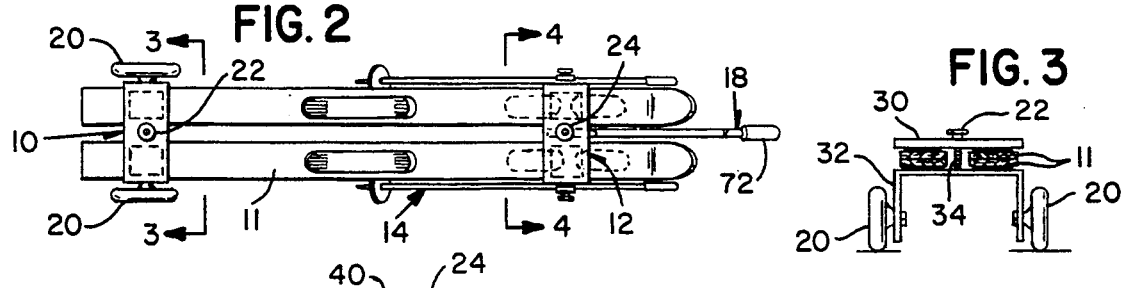
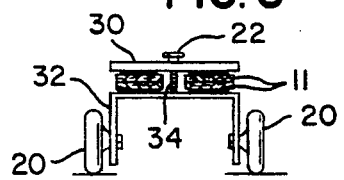
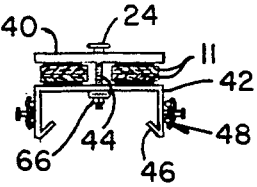
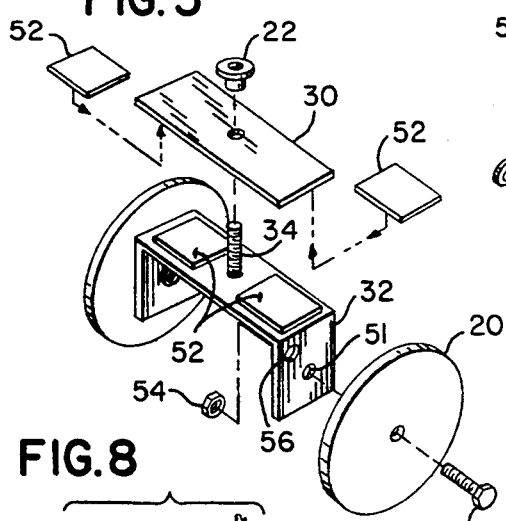
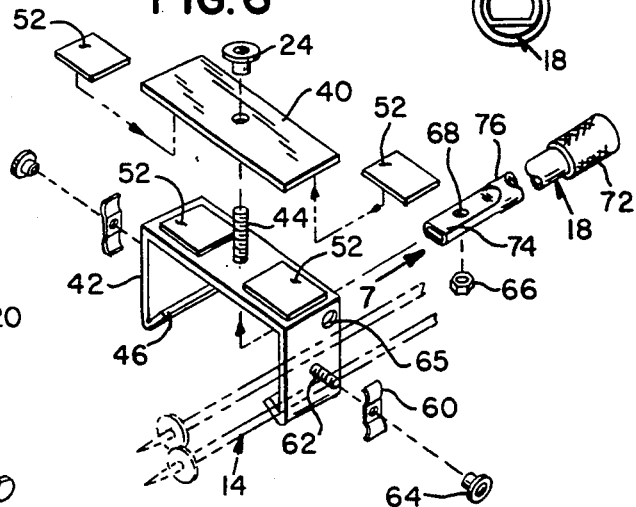
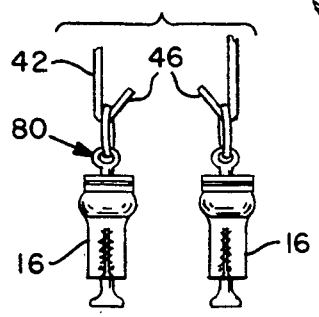

SKI TRANSPORT DOLLY

BACKGROUND OF THE INVENTION

This invention relates to an apparatus for carrying skis.

Skiers must carry a great deal of equipment to the slopes. In addition to skis, they must also carry boots and poles. At certain resorts, skiers must carry all of their equipment for a considerable distance before reaching the slopes. Carrying skis and related equipment can be tiresome and in many cases hazardous to the skier and others. It is therefore highly desirable for a skier to have a device that will safely carry their skis, boots and poles together while reducing the effort necessary to carry the same.

U.S. Pat. Nos. 4,666,184 to Garvey, Jr. and 4,792,159 to Garvey Jr. et al, disclose two-wheel ski carriers adapted for carrying a pair of skis.

U.S. Pat. No. 4,540,198 to Kybutz discloses a one-wheel ski carrier adapted for carrying a pair of skis.

While these units may be suitable for the particular purpose to which they address, they would not be as suitable for the purpose of the present invention as hereafter described.

SUMMARY OF THE INVENTION

A primary object of the present invention is to provide a ski transport dolly that will overcome the shortcomings of the prior art devices.

A further object of the invention to create a ski carrier that can carry skis, boots and poles for two skiers.

It is another object to produce a ski carrier that is portable, and can be easily stored both in a ski resort locker, and at home.

The present invention contemplates a two component ski carrier. A wheel component is secured to the skis and contains a pair of wheels. The handle component is also secured to the skis, but also contains provisions for holding ski poles and boots. This allows the ski equipment to be integrated into a single transportable unit that can be rolled, rather than carried.

A still further object is to provide a ski transport dolly that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the claims.

BRIEF DESCRIPTION OF THE DRAWINGS

The figures on the drawings are now briefly described.

FIG. 1 is a diagrammatic perspective view illustrating the instant invention in use.

FIG. 2 is an elevational view taken in the direction of arrow 2 in FIG. 1.

FIG. 3 is a cross sectional view taken on line 3—3 of FIG. 2.

FIG. 4 is a cross sectional view taken on line 4—4 of FIG. 2.

FIG. 5 is an exploded diagrammatic perspective view of the wheel component of the instant invention.

FIG. 6 is a diagrammatic perspective view of the handle component of the instant invention.

FIG. 7 is an enlarged view with parts broken away taken in the direction of arrow 7 in FIG. 6.

FIG. 8 is an enlarged view illustrating the ski boot carrying portion of the invention.

DETAILED DESCRIPTION OF THE PREFERRED EMBODIMENTS

Turning now descriptively to the drawings, in which like reference characters denote like elements throughout the several views. The following is a detailed description of the invention in the embodiments illustrated by the drawings.

FIG. 1 shows a side view of the ski transport dolly in use by a skier. The wheel component 10 is secured to one end of the skis 11. The handle component 12 is secured to the other end of the skis 11. Also attached to the handle component are poles 14 and boots 16. The handle component 12 also has a tubular handle 18 with a bicycle handle grip 72.

FIG. 2 shows a top view of the ski transport dolly carrying associated ski gear. Two pairs of skis, each pair consisting of two skis back to back, are being carried. The wheel component 10 is attached to the skis 11. A pair of wheels 20 are attached to the wheel component 10 on the sides. A tightening knob 22 is located on the top of the wheel component 20 for tightening the wheel component to the skis 11. The handle component 12 has provisions for carrying ski poles 14 on the sides. The handle component also has a tubular handle 18 with a bicycle handle grip 72. A tightening knob 24 is located on the top of the handle component 12.

FIG. 3 is a sectional view as indicated in FIG. 2, showing the skis mounted in the wheel component. The skis 11 are held between a wheel component frame 32 and a clamp plate 30. The clamp plate 30 is attached to the wheel component frame 32 by a bolt 34, and a tightening knob 22. A pair of wheels 20 are mounted on the sides of the wheel component frame 32.

FIG. 4 is a sectional view as indicated in FIG. 2, showing the skis mounted in the handle component. The skis 11 are held between a clamp plate 40 and a handle component frame 42. The clamp plate 40 is attached to the handle component frame 42 by a bolt 44 and a tightening knob 24. The sides of the handle component frame 42 have a lip 46 for supporting ski boots 16. The sides of the handle component frame 42 also have a clamping mechanism 48, for mounting ski poles 14.

FIG. 5 details the construction of the wheel component. The wheel component frame 32 attaches to the clamp plate 30 by a bolt 34, and a tightening knob 22. The tightening knob is internally threaded to match the bolt 34. A pair of protective pads 52, preferably made of rubber, are mounted on the clamp plate 30 to protect the skis. Protective pads 52 are also mounted on the wheel component frame 32 to protect the skis. In this embodiment, the wheel 20 is attached to the wheel component frame 32 by a bolt 50 through a hole in the side of the wheel component frame 51 and a nut 54. A hole is provided in the wheel component frame 56 for use of an anti-theft device, such as a bicycle cable type lock.

FIG. 6 details the construction of the handle component. The handle component frame 42 has a lip 46 for supporting ski boots carrier 80. The clamp plate 40 is attached to the handle component frame 42 by a thread stud 44 and a tightening knob 24. A pair of protective pads 52 are mounted on the clamp plate 40, and another pair on the handle component frame 42, to protect the skis. A small clamp plate 60 is used to secure the ski poles to the sides of the handle component frame 42, it is secured by a bolt 62 and a small tightening knob 64. The tubular handle 18 with bicycle handle grip 72 is attached to the handle component frame 42, by means of a hole through the handle 68 with the thread stud 44 that extends through the handle component frame 42, and a nut 66. A hole is provided in the handle component frame 65 for use of an anti-theft device, such as a bicycle cable type lock.

FIG. 7 is the view indicated by arrow 7 in FIG. 6. It shows that the distal portion 74 of the handle 18 is substantially flattened, to ease attachment to the handle component frame, and to aid in even weight distribution at their juncture. The portion beyond the distal portion is substantially tubular 76.

FIG. 8 shows how the ski boots 14 attached to the ski carrier. The ski boots 14 in a standard ski boot carrier 80 are hung on the lip 46 of the handle component frame 46.

The ski carrier should be constructed with materials that resist rusting, typically aluminum, stainless steel, rubber and plastic. It is preferred to construct the wheel component frame and handle component frame using aluminum.

What is claimed is:

1. A ski carrier for transporting ski equipment, comprising:
   a) a wheel component, capable of being attached to at least two skis at a first end of the skis, said wheel component having two wheels and further comprising:
      a wheel component frame, on which the wheels are mounted;
      a clamp plate; and
      a fastening means for attaching the wheel component frame to the clamp plate; and
   b) a handle component having a means for holding ski poles and ski boots, and capable of being attached to said at least said two skis at a second end, so that the skis can be pulled on the wheels, the handle component further comprising:
      a handle component frame;
      a handle clamp plate; and
      a fastening means for attaching the handle component frame to the handle clamp plate.

2. The apparatus as recited in claim 1, wherein the means for holding ski poles and ski boots further comprises:
   a) a lip for holding ski boots carrier attached to the handle component frame;
   b) and a small clamp plate, for clamping ski poles to the handle component frame.

3. The apparatus as recited in claim 1, wherein the handle component further comprises: a tubular handle with a bicycle handle grip, said handle having a substantially flattened end, to ease mounting to the handle component frame and to aid weight distribution at the juncture between the handle component frame and tubular handle.

4. The apparatus as recited in claim 3, wherein the wheel component further comprises an aperture for allowing the wheel component to be secured from theft with a bicycle cable lock.

5. The apparatus as recited in claim 3, wherein the handle component further comprises an aperture for allowing the handle component to be secured from theft with a bicycle cable lock.

6. A ski carrier for transporting ski equipment, comprising: a wheel component, having a wheel component frame, having a pair of wheels attached to the wheel component frame, so that the carrier may be rolled, and having a means for clamping the wheel component frame onto a first end of a pair of skis, which means comprises a clamping plate and a bolt means for fastening the clamping plate to the wheel component frame; and a handle component comprising a handle component frame, a handle attached to the handle component frame so that the carrier may be pulled, a bolt means for clamping ski poles to the handle component frame and means for clamping the handle component frame onto second end of said pair of skis.

7. The apparatus as recited in claim 6, wherein the handle component further comprises a lip attached to the handle component frame for supporting ski boots carriers.

8. The apparatus as recited in claim 7, wherein the means for clamping ski poles to the handle component frame further comprises a clamping plate, and a bolt means for fastening the clamping plate to the handle component frame.

9. The apparatus as recited in claim 8, further comprising a means for securing the apparatus to prevent theft with a bicycle cable lock.

10. The apparatus as recited in claim 9, wherein the handle comprises a tubular handle having a bicycle handle grip.

* * * * *